Patented Apr. 8, 1941

2,237,628

UNITED STATES PATENT OFFICE 2,237,628

SEPARATION OF TRI-ETHYL AMINE FROM REACTION MIXTURES

John F. Olin, Grosse Ile, Mich., and George E. Hinds, Philadelphia, Pa., assignors to The Sharples Solvents Corporation, Philadelphia, Pa., a corporation of Delaware No Drawing. Application December 14, 1939, Serial No. 309,182

7 Claims. (Cl. 260—583)

The present invention pertains to the purification of crude reaction mixtures obtained in the preparation of tri-ethyl amine.

A commercially satisfactory method of manufacturing tri-ethyl amine involves vapor phase alkylation of ammonia or mono- or di-ethyl amines, by passage of the ammonia or amine, together with ethyl alcohol or ether, through a heated tube containing a dehydrating catalyst. A second satisfactory method for the manufacture of tri-ethyl amine involves alkylation of the di-ethyl amine by reacting it with ethyl chloride and sodium hydroxide.

By the first method acetonitrile may be produced as an impurity. Thus, in addition to the difficulty of separating the tri-ethyl amine from the unreacted reagent alcohol (or by-product alcohol in case ether is used for alkylation), the situation is further complicated by the fact that acetonitrile forms what appears to be a ternary constant boiling mixture with water and tri-ethyl amine.

By the second method acetonitrile is absent from the reaction mixture. However, part of the ethyl chloride reacts with the sodium hydroxide to produce ethyl alcohol, as follows:

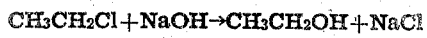

While ethyl alcohol does not form a ternary constant boiling mixture with water and tri-ethyl amine it does form a binary constant boiling mixture with water, which boils at 78.1° C. The complete separation of this mixture from the binary constant boiling mixture of tri-ethyl amine and water boiling at 74°, is virtually impossible by fractionation.

Regardless of which of the above methods of manufacturing tri-ethyl amine is used, the tri-ethyl amine reaction mixture will thus contain impurities such as ethyl alcohol, acetonitrile, and water. The ethyl alcohol and acetonitrile are miscible with water in substantially all proportions at ordinary temperatures, and the tri-ethyl amine is also soluble to a considerable extent at such temperatures. For this reason, the simple water washing of the reaction mixture will not afford the desired result of separating the other organic constituents from the tri-ethyl amine.

Tri-ethyl amine cannot be satisfactorily separated from acetonitrile and water by simple fractional distillation, for these three compounds form an azeotrope which boils at 67° C. and contains approximately 63% of tri-ethyl amine, 30% acetonitrile and 7% water. It has therefore been necessary for chemists concerned with this separation problem to resort to the rather expensive treatment of acidulation, distillation and subsequent alkali treatment described below in solving that problem.

In accordance with the acidulation process, crude reaction mixtures containing tri-ethyl amine, ethyl alcohol, and/or acetonitrile and water were treated with sulfuric acid to form tri-ethyl ammonium sulfate. The acidulated reaction mixture was then distilled to pass overhead the alcohol, nitrile and water, leaving a residue of tri-ethyl ammonium sulfate. The tri-ethyl ammonium sulfate was then treated with sodium hydroxide to again release the free amine and form sodium sulfate. The liberated amine was then separated from the solution of sodium sulfate by distillation, dried by treatment with sodium hydroxide and redistilled.

The process of separation of the tri-ethyl amine by acidulation and distillation has certain serious disadvantages. In the first place, this process involves the use of a considerable quantity of chemical reagents. In the second place, the ammonium salts are very corrosive, and neither ordinary steel nor most stainless steels can be used for the construction of distillation apparatus.

Presumably corrosion takes place because of hydrolysis of the salt in accordance with the following equation:

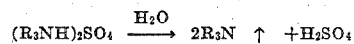

By such hydrolysis tri-ethylamine may be swept over with the alcohol and nitrile during distillation, not only producing a loss in yield, but leaving the still pot actually acid with sulfuric acid.

An object of the present invention has been to provide a process of purifying tri-ethyl amine contained in reaction mixtures of the character described above, which would afford a more satisfactory solution of the problem than that afforded by the acidulation and distillation process.

More detailed objects have been to provide a process by which the expense of reagents used in the acidulation and distillation process can be avoided, and by which the yield of tri-ethyl amine is improved, and the problem of corrosion avoided.

Further objects and advantages of the invention, and the manner in which they have been attained, will be evident from the following discussion of the detailed technique of the invention.

As stated above, the tri-ethyl amine, like the impurities present in the crude tri-ethyl amine reaction mixture remaining after lower boiling constituents such as mono- and di-ethyl amines have been distilled off, is too soluble in water to permit of efficient separation by water washing at ordinary temperatures. These impurities and tri-ethyl amine are also miscible with each other. It has been discovered, however, that by washing the reaction mixture with water at an elevated temperature, the surprising result is obtained of solution of impurities in the water, with precipitation of the tri-ethyl amine from its solution in the remaining constituents of the mixture. Thus, when a mixture constituting the residue remaining after distillation of the lighter constituents from a crude tri-ethyl amine reaction mixture is washed with an equal volume of water at a temperature of 60° C., the acetonitrile and ethyl alcohol are dissolved in the water, while the tri-ethyl amine remains almost completely undissolved. In order to obtain a more thorough removal of the organic impurities from the tri-ethyl amine, it is preferable that the washing operation be repeated two or more times.

It is possible to effect substantial purification of the crude tri-ethyl amine by a washing operation performed at any temperature in excess of 40° C., but best results are obtained when temperatures above 50° C. are used.

The tri-ethyl amine obtained by removal of water-soluble impurities by extraction at elevated temperatures as described above, contains some water, and this water is removed by treatment of the amine with a base. Thus, 10% by volume of a 50% solution of sodium hydroxide may be added to the water-washed tri-ethylamine to effect drying thereof. At the conclusion of this drying operation, the tri-ethyl amine is distilled. The first overhead fraction of this distillation will consist of a small amount of a mixture containing tri-ethyl amine, water, and a trace of alcohol. This first overhead fraction may be returned to the next batch of crude tri-ethyl amine for water washing with that material to remove the alcohol content.

Regardless of the exact initial content of the crude tri-ethyl amine subjected to water washing, whether that crude amine contains alcohol, acetonitrile, or both, the wash water will contain some tri-ethyl amine, and it is desirable that this tri-ethyl amine be recovered from the water. This may be accomplished by subjecting the wash water to fractional distillation to obtain an overhead cut containing the tri-ethyl amine and some organic impurities, and subjecting this overhead cut to special treatment for the recovery of tri-ethyl amine. The overhead cut in question may, for example, be recycled to the water washing operation performed on a subsequent batch of the crude tri-ethyl amine, in order to recover the tri-ethyl amine from the wash water. By operating in this manner, the alcohol and/or acetonitrile may be removed from this overhead fraction at the same time that alcohol is removed from the next subsequent crude amine batch.

In case the original crude material contains acetonitrile, this compound will of course also be obtained in the first overhead fraction obtained by distillation of the wash water. The tri-ethyl amine may, in such case, be obtained from this overhead fraction by the process of water washing with a fresh batch of crude amine, as discussed above, or by separate washing of this fraction at a temperature in excess of 40° C., or the recovery of the tri-ethyl amine may be accomplished by a process including hydrolysis of the acetonitrile. Thus, the overhead fraction containing the nitrile and amine may be mixed with a basic solution (e. g., a solution of sodium hydroxide). The sodium hydroxide solution causes hydrolysis of the nitrile and neutralization of the resulting acetic acid, in accordance with the following composite equation:

$$CH_3CN + H_2O + NaOH \rightarrow CH_3COO\ Na + NH_3$$

The desired amine may then be distilled from the sodium acetate solution resulting from the above reaction.

In case the wash water contains both acetonitrile and ethyl alcohol as contaminants of the tri-ethyl amine, the overhead fraction obtained after hydrolysis of the acetonitrile will contain both the desired tri-ethyl amine and ethyl alcohol. The alcohol of this last-mentioned overhead fraction may be recovered by returning this mixture of alcohol and amine to the water washing operation performed on a subsequent batch of crude amine, or by separate water washing of the mixture.

When a mixture containing acetonitrile and tri-ethyl amine is to be treated with a base to effect removal of the acetonitrile as in the cases in which the overhead fraction of the distillation of the wash water contains acetonitrile and ethyl alcohol, or acetonitrile without ethyl alcohol, as discussed above, the treatment of the fraction in question may be accomplished simultaneously with the alkylation of a subsequent batch of di-ethyl amine. Thus, a common method of alkylating di-ethyl amine involves treatment of the di-ethyl amine with ethyl chloride in the presence of a base capable of forming an irreversible salt with the hydrochloric acid liberated during the course of the alkylation reaction. If the overhead fraction from the wash water distillation, containing acetonitrile and tri-ethyl amine is passed to the reaction vessel in which further alkylation of di-ethyl amine by treatment with ethyl chloride is being accomplished, the acetonitrile can be hydrolized at the same time that the additional di-ethyl amine is being converted to tri-ethyl amine. The crude tri-ethyl amine so produced may then be subjected to water washing at a temperature in excess of 40° C., with the result that the ethyl alcohol is separated from the crude amine, and an additional quantity of tri-ethyl amine is obtained from the wash water as a part of the reaction mixture.

EXAMPLE I

*Purification of tri-ethyl amine containing ethyl alcohol and water as impurities*

A reaction mixture resulting from the alkylation of di-ethyl amine with ethyl chloride in the presence of aqueous caustic soda is treated in accordance with the present invention. The material may be subjected to a preliminary fractionation to remove unreacted di-ethyl amine and water. The mixture constituting the residue of this preliminary fractionation will distill between 70° and 80° and will contain approximately 75% tri-ethyl amine, 18% ethanol and 7% water.

1000 g. of such a mixture is mixed with 1000 cc. of cold water. A single homogeneous system will result. On warming turbidity first appears, followed by the separation of a lighter (organic) layer. This layer will continue to grow in size until a temperature of about 65° C. is reached. Heating is now discontinued and the lower layer, which will have a volume of about 1125 cc., is separated by decantation. The upper layer is now washed with two successive 1000 cc. portions of water at 60° C., dried by treatment with 100 cc. of 50% NaOH solution and subjected to fractional distillation through an efficient column.

After a forerun of approximately 40 g. boiling below 86° C. and containing tri-ethyl amine, water and a trace of alcohol, there is obtained 660 g. of pure tri-ethyl amine which will boil by the Engler method between 87 and 90° C. The forerun may be cycled with the next batch to the water washing operation.

The water washes shown above contain much ethyl alcohol and some tri-ethyl amine. These values may be recovered by subjecting the material to a careful fractional distillation. In this operation a heads cut may be taken which will boil up to 77.5° C. This cut will be rich in tri-ethyl amine, but will also contain much ethyl alcohol and some water, and may be recycled with the next batch for extraction with water. The remaining organic material will boil between 77.5° C. and 80° C. and is alcohol, containing small amounts of tri-ethyl amine and water. It may be conveniently returned to the catalytic process for reaction with ammonia to produce further quantities of ethyl amines.

EXAMPLE II

*Separation of tri-ethyl amine from tri-ethyl amine-water-acetonitrile azeotrope*

1000 g. of the azeotrope containing approximately 63% tri-ethyl amine, 30% acetonitrile and 7% water and which boils constantly at 67° C., is subjected to four successive water washings with 1000 cc. of water at 60° C. During this operation the oil layer will decrease to a volume of about 800 cc. It is then dried while still warm by shaking with 40 g. of flaked NaOH. The crude amine, which by titration shows a purity of 99%, may be further improved by fractionation to yield a very pure tri-ethyl amine. Acetonitrile, containing about 15% tri-ethyl amine, is obtained by stripping the water washes.

The tri-ethyl amine may be recovered from the overhead fraction so obtained by washing with water at a temperature in excess of 40° C. or treatment with a base and subsequent distillation, as discussed above.

EXAMPLE III

*Separation of tri-ethyl amine from mixtures containing water and both ethyl alcohol and acetonitrile*

2000 g. of a mixture boiling between 67 and 80° C. and obtained by a fractionation of the bottoms produced through the catalytic alkylation of ethanol with ammonia, and containing approximately 65% tri-ethyl amine, 15% acetonitrile, 12% ethanol and 8% water, is subjected to a first water wash with 3000 cc. of water at 60° C. This is then followed by two further washes with 1500 cc. of water at 70° C. Upon drying the oil layer with sodium hydroxide it will be found to weigh about 1200 g. and titrate 98% or more as tri-ethyl amine. Further tri-ethyl amine may be recovered from the wash water by a process involving distillation to collect an overhead fraction containing tri-ethyl amine, acetonitrile and ethyl alcohol. Tri-ethyl amine may be recovered from this overhead fraction by washing the fraction with water, as discussed above in connection with Example II. As an alternative to such treatment, the tri-ethyl amine may be recovered by treatment of the overhead fraction with a base, distillation of the resulting material to pass overhead a mixture containing tri-ethyl amine and ethyl alcohol, and subsequent water washing of the mixture of tri-ethyl amine and ethyl alcohol so obtained to remove ethyl alcohol, all as described above.

Further modifications will be obvious to those skilled in the art and we do not therefore wish to be limited except by the scope of the subjoined claims.

We claim:

1. The process of separating tri-ethyl amine from a reaction mixture containing said tri-ethyl amine, water and at least one organic contaminant chosen from the class consisting of ethyl alcohol, acetonitrile and mixtures of ethyl alcohol and acetonitrile, which comprises extracting said organic contaminant from the tri-ethyl amine by washing said reaction mixture with water at a temperature in excess of 40° C.

2. The process of separating tri-ethyl amine from a reaction mixture containing said tri-ethyl amine, water and organic contaminants consisting of ethyl alcohol and acetonitrile, which comprises extracting said organic contaminants from the tri-ethyl amine by washing said reaction mixture with water at a temperature in excess of 40° C.

3. The process of separating tri-ethyl amine from a reaction mixture containing said tri-ethyl amine, water and acetonitrile, which comprises extracting said acetonitrile from the tri-ethyl amine by washing said reaction mixture with water at a temperature in excess of 40° C.

4. The process of separating tri-ethyl amine from a reaction mixture containing said tri-ethyl amine, water and ethyl alcohol, which comprises extracting said ethyl alcohol from the tri-ethyl amine by washing said reaction mixture with water at a temperature in excess of 40° C.

5. The process of separating tri-ethyl amine from a reaction mixture containing said tri-ethyl amine, water and at least one organic contaminant chosen from the class consisting of ethyl alcohol, acetonitrile and mixtures of ethyl alcohol and acetonitrile, which comprises extracting said organic contaminant from the tri-ethyl amine by washing said reaction mixture with water at a temperature in excess of 40° C., and thereafter mixing the crude tri-ethyl amine from which said organic contaminant has been removed with a base to remove water from said tri-ethyl amine.

6. The process of separating tri-ethyl amine from a reaction mixture containing said tri-ethyl amine, water and at least one organic contaminant chosen from the class consisting of ethyl alcohol, acetonitrile and mixtures of ethyl alcohol and acetonitrile, which comprises extracting said organic contaminant from the tri-ethyl amine by washing said reaction mixture with water at a temperature in excess of 40° C., thereafter distilling the wash water to pass overhead a fraction containing tri-ethyl amine and organic impurities, and subjecting the resulting overhead fraction to a second water washing operation at a temperature in excess of 40° C.

7. The process as defined in claim 6, characterized by the further feature that the last-mentioned water washing operation is accomplished in the same operation in which the water washing of a subsequent tri-ethyl amine-containing reaction mixture is performed.

JOHN F. OLIN.
GEORGE E. HINDS.